United States Patent
Xu (10) Patent No.: US 11,972,599 B2
(45) Date of Patent: Apr. 30, 2024

(54) METHOD AND APPARATUS FOR GENERATING VEHICLE DAMAGE IMAGE ON THE BASIS OF GAN NETWORK

(71) Applicant: Advanced New Technologies Co., Ltd., Grand Cayman (KY)

(72) Inventor: Juan Xu, Hangzhou (CN)

(73) Assignee: Advanced New Technologies Co., Ltd., George Town (KY)

(*) Notice: Subject to any disclaimer, the term of this patent is extended or adjusted under 35 U.S.C. 154(b) by 556 days.

(21) Appl. No.: 17/141,790

(22) Filed: Jan. 5, 2021

(65) Prior Publication Data

US 2021/0133501 A1 May 6, 2021

Related U.S. Application Data

(63) Continuation of application No. PCT/CN2019/096526, filed on Jul. 18, 2019.

(30) Foreign Application Priority Data

Sep. 4, 2018 (CN) .......................... 201811027110.1

(51) Int. Cl.
*G06V 10/44* (2022.01)
*G06F 18/214* (2023.01)
(Continued)

(52) U.S. Cl.
CPC .......... *G06V 10/454* (2022.01); *G06F 18/214* (2023.01); *G06N 3/045* (2023.01);
(Continued)

(58) Field of Classification Search
CPC ........... G06V 10/454; G06V 30/19173; G06V 30/274; G06V 2201/08; G06F 18/214;
(Continued)

(56) References Cited

U.S. PATENT DOCUMENTS 6,397,334 B1 5/2002 Chainer
7,093,129 B1 8/2006 Gavagni
(Continued)

FOREIGN PATENT DOCUMENTS

WO 2017059576 4/2017
WO 2018055340 3/2018

OTHER PUBLICATIONS

Hyungtae Lee et al.: "Fast Object Localization Using a CNN Feature Map Based Multi-Scale Search", arxiv.org, Cornell University Library, 201 Olin Library Cornell University Ithaca, NY 14853, Apr. 12, 2016, XP080695042, Section 3.2, Figure 3.
(Continued)

*Primary Examiner* — Mia M Thomas
(74) *Attorney, Agent, or Firm* — Seed IP Law Group LLP (57) ABSTRACT

Embodiments of the present specification disclose a system and method for generating a vehicle damage image on the basis of a GAN model. During operation, the system obtains a real vehicle image, generates an intermediate image based on the real vehicle image by labeling a target box on the real vehicle image and removing a portion of the real vehicle image within the target box, and generates the vehicle damage image based on the intermediate image by inputting the intermediate image into a machine-learning model, which outputs the vehicle damage image by filling a local image indicating vehicle damage into the target box of the intermediate image.

21 Claims, 8 Drawing Sheets

(51) Int. Cl.
*G06N 3/045* (2023.01)
*G06N 3/088* (2023.01)
*G06T 11/00* (2006.01)
*G06V 30/19* (2022.01)
*G06V 30/262* (2022.01)

(52) U.S. Cl.
CPC .............. *G06N 3/088* (2013.01); *G06T 11/00* (2013.01); *G06V 30/19173* (2022.01); *G06V 30/274* (2022.01)

(58) Field of Classification Search
CPC ...... G06F 18/241; G06N 3/045; G06N 3/088; G06T 11/00; G06T 7/00; G06T 11/60; G06T 11/40
See application file for complete search history.

(56) References Cited

U.S. PATENT DOCUMENTS

| | | |
|---|---|---|
| 7,401,012 B1 | 7/2008 | Bonebakker |
| 7,872,584 B2 | 1/2011 | Chen |
| 8,180,629 B2 | 5/2012 | Rehberg |
| 8,448,226 B2 | 5/2013 | Narasimhan |
| 8,966,613 B2 | 2/2015 | Horvitz |
| 9,036,943 B1 | 5/2015 | Baldwin |
| 9,582,843 B2 | 2/2017 | Leonard |
| 9,607,138 B1 | 3/2017 | Baldwin |
| 10,445,638 B1* | 10/2019 | Amirineni ............... G06F 17/11 |
| 10,475,014 B1 | 11/2019 | Ramalingam |
| 10,554,738 B1 | 2/2020 | Ren |
| 10,699,168 B1* | 6/2020 | Xu ......................... G06Q 10/00 |
| 10,846,716 B1* | 11/2020 | Chow ................... G06T 7/0002 |
| 11,138,292 B1* | 10/2021 | Nair ........................ G06N 3/063 |
| 2001/0046659 A1 | 11/2001 | Oster |
| 2002/0136459 A1 | 9/2002 | Imagawa |
| 2003/0229789 A1 | 12/2003 | Morais |
| 2004/0167765 A1 | 8/2004 | Abu El Ata |
| 2004/0196363 A1 | 10/2004 | Diamond |
| 2005/0232424 A1 | 10/2005 | Dobranski |
| 2009/0087025 A1 | 4/2009 | Ma |
| 2009/0206993 A1 | 8/2009 | Di Mambro |
| 2010/0128923 A1 | 5/2010 | Kiya |
| 2010/0135490 A1 | 6/2010 | Kwon |
| 2011/0069892 A1 | 3/2011 | Tsai |
| 2011/0162679 A1 | 7/2011 | Demmeler |
| 2012/0269346 A1 | 10/2012 | Best |
| 2013/0015946 A1 | 1/2013 | Lau |
| 2013/0182002 A1 | 7/2013 | Macciola |
| 2013/0208103 A1 | 8/2013 | Sands |
| 2013/0208956 A1* | 8/2013 | Wehnes ............... G06V 10/454 382/128 |
| 2014/0037184 A1 | 2/2014 | Gorski |
| 2014/0270411 A1 | 9/2014 | Shu |
| 2014/0309805 A1 | 10/2014 | Ricci |
| 2014/0313334 A1 | 10/2014 | Slotky |
| 2015/0036891 A1 | 2/2015 | Takenouchi |
| 2015/0103170 A1 | 4/2015 | Nelson |
| 2015/0110364 A1 | 4/2015 | Niinuma |
| 2015/0110366 A1 | 4/2015 | Sezille |
| 2015/0341370 A1 | 11/2015 | Khan |
| 2016/0034786 A1 | 2/2016 | Suri |
| 2016/0044030 A1 | 2/2016 | Galwas |
| 2016/0063235 A1 | 3/2016 | Tussy |
| 2016/0283787 A1 | 9/2016 | Nepomniachtchi |
| 2016/0307029 A1 | 10/2016 | Vaknin |
| 2017/0048244 A1 | 2/2017 | Loughlin-Mchugh |
| 2017/0060867 A1 | 3/2017 | Moutinho |
| 2017/0061563 A1 | 3/2017 | Falkenstern |
| 2017/0148102 A1 | 5/2017 | Franke |
| 2017/0221110 A1* | 8/2017 | Sullivan ................ G06Q 10/20 |
| 2017/0293894 A1 | 10/2017 | Taliwal |
| 2018/0047208 A1 | 2/2018 | Marin |
| 2018/0083973 A1 | 3/2018 | Paraskevas |
| 2018/0182039 A1 | 6/2018 | Wang |
| 2018/0247112 A1 | 8/2018 | Norimatsu |
| 2018/0260793 A1* | 9/2018 | Li ........................... G06Q 40/08 |
| 2018/0293552 A1* | 10/2018 | Zhang ............. G06Q 10/06395 |
| 2018/0293664 A1* | 10/2018 | Zhang .................. G06V 10/454 |
| 2018/0293806 A1* | 10/2018 | Zhang ...................... G06N 3/08 |
| 2018/0300576 A1 | 10/2018 | Dalyac |
| 2019/0035112 A1 | 1/2019 | Lee |
| 2019/0073641 A1 | 3/2019 | Utke |
| 2019/0095877 A1* | 3/2019 | Li ........................... G06V 20/63 |
| 2019/0156178 A1 | 5/2019 | Thornton |
| 2019/0266015 A1 | 8/2019 | Chandra |
| 2019/0294878 A1 | 9/2019 | Endras |
| 2019/0355366 A1 | 11/2019 | Ng |
| 2020/0005151 A1 | 1/2020 | Jiang |
| 2020/0034958 A1 | 1/2020 | Campbell |
| 2020/0050867 A1* | 2/2020 | Zhang ..................... G06V 20/41 |
| 2020/0050939 A1 | 2/2020 | Zhu |
| 2020/0051237 A1 | 2/2020 | Spivey |
| 2020/0065632 A1* | 2/2020 | Guo ........................ H04N 23/64 |
| 2020/0074222 A1* | 3/2020 | Guo ......................... G06N 3/08 |
| 2020/0074560 A1* | 3/2020 | Xu ........................... G06N 3/08 |
| 2020/0125885 A1* | 4/2020 | Hou ....................... G06N 3/045 |
| 2020/0175352 A1 | 6/2020 | Cha |
| 2020/0349370 A1 | 11/2020 | Lambert |
| 2020/0357196 A1* | 11/2020 | Zhang .................... G06F 18/253 |
| 2021/0056753 A1* | 2/2021 | Yasar ...................... G06N 20/00 |
| 2021/0174170 A1* | 6/2021 | Tu ........................... G06F 40/58 |
| 2021/0174493 A1* | 6/2021 | Xu ......................... G06N 3/045 |
| 2021/0334942 A1* | 10/2021 | Wang ........................ G06T 5/50 |
| 2021/0341989 A1* | 11/2021 | Chen ....................... G06F 3/017 |
| 2021/0383584 A1* | 12/2021 | Zhang ...................... G06N 3/08 |

OTHER PUBLICATIONS

Zhou Huabing et al.: "Image Classification Based on Region of Interest Detection", Visual Communications and Image Processing; Jan. 20, 2004; San Jose; vol. 9813, Dec. 14, 2015, pp. 98130U-98130U, XP060063208, paragraph [0001]; figure 1.

W. Samek, T. Wiegand, and K.- R. Muller. (2017). Explainable artificial Intelligence: understanding, visualizing and interpreting deep learning models.: [Online]. Available: https://arxiv.org/abs/1708.08296 (Year: 2017).

Jeffery De Dejin, ("Automatic car damage recognition using convolutional neural networks", Internship report MSc Business Analytics Mar. 29, 2018, pp. 1-53, Vrije Universiteit Amsterdam Faculty of Science, Amsterdam)(Year:2018).

\* cited by examiner

METHOD AND APPARATUS FOR GENERATING VEHICLE DAMAGE IMAGE ON THE BASIS OF GAN NETWORK

RELATED APPLICATION

Under 35 U.S.C. § 120 and § 365(c), this application is a continuation of PCT Application No. PCT/CN2019/096526, entitled "METHOD AND APPARATUS FOR GENERATING VEHICLE DAMAGE IMAGE ON THE BASIS OF GAN NETWORK," by inventor Juan Xu, filed 18 Jul. 2019, which claims priority to Chinese Patent Application No. 201811027110.1, filed on 4 Sep. 2018.

TECHNICAL FIELD

Embodiments of the present specification relate to the technical field of image processing, and more particularly relate to a method and apparatus for training a discriminative model for vehicle damage images, a method and apparatus for training an image filling model, and a method and apparatus for generating a vehicle damage image.

BACKGROUND

In a conventional scenario of vehicle insurance claim settlement, an insurance company needs to send professional inspection and assessment personnel to a scene of accident to perform on-site inspection and loss assessment, determine a vehicle repair plan and an amount of compensation, take on-site photographs, and archive the photographs for loss assessment such that verification personnel can verify the loss and the amount of compensation. Because manual inspection and loss assessment are required, the insurance company needs to invest a great amount of labor costs and costs for providing training to improve professional knowledge. From the perspective of general user experience, a claim settlement period is long because the claim settlement process involves manually taking on-site photographs by inspection personnel, performing loss assessment by assessment personnel at a repair site, and performing loss verification by loss verification personnel at the backend.

With the development of the Internet, emerged is a claim settlement scheme in which, after a user takes photographs of vehicle damage on site and uploads the photographs to a server, loss assessment is performed by an algorithm or manually on the basis of the vehicle damage photographs so as to settle a claim. However, in this scheme, when training an algorithm model used for performing loss assessment on the basis of vehicle damage photographs, there is a need for manually labeling a large number of vehicle damage photographs, which requires a great amount of manpower, and it is difficult to collect data that exhausts various vehicle models, lighting conditions, degrees of usage, image capturing angles, and the like.

Therefore, there is a need for a more efficient solution for acquiring vehicle damage images used as training samples.

SUMMARY

Embodiments of the present specification are intended to provide a more efficient scheme for acquiring vehicle damage images to address deficiencies in current technologies.

One aspect of the present specification provides a system and method for generating a vehicle damage image. During operation, the system obtains a real vehicle image, generates an intermediate image based on the real vehicle image by labeling a target box on the real vehicle image and removing a portion of the real vehicle image within the target box, and generates the vehicle damage image based on the intermediate image by inputting the intermediate image into a machine-learning model, which outputs the vehicle damage image by filling a local image indicating vehicle damage into the target box of the intermediate image.

In a variation on this embodiment, the real vehicle image comprises one or more local images indicating vehicle damage, and labeling the target box comprises randomly selecting a labeling location corresponding to one of the one or more local images indicating vehicle damage.

In a variation on this embodiment, labeling the target box comprises: determining, based on statistics, a plurality of locations at which vehicle damage occurs with a high probability; and randomly selecting, from the plurality of locations, a location for labeling the target box.

In a variation on this embodiment, removing a portion of the real vehicle image comprises applying a mask, which comprises performing a dot-product operation on the real vehicle image and the mask.

In a variation on this embodiment, the machine-learning model is a generative model in a Generative Adversarial Network (GAN) model, the GAN model further comprises a discriminative model for determining whether an output image of the generative model is a real image and whether a local image indicating vehicle damage is in the target box of the output image, and the generative model is trained based on the discriminative model, a second real vehicle image, and a second intermediate imaged generated based on the second real vehicle image.

In a further variation, the system trains the discriminative model by obtaining a plurality of positive samples and a plurality of negative samples and using the plurality of positive samples and the plurality of negative samples to train a classification model to be used as the discriminative model. A respective positive sample is a real image comprising a labeled target box, and the target box of the positive sample comprises a local image indicating vehicle damage. The plurality of negative samples comprises a first negative sample being a non-real image comprising a labeled target box, and the negative sample is obtained by replacing the local image within the target box of a real image with another local image.

In a further variation, the first negative sample comprises at least one of the following features: component inconsistency within and outside the target box, vehicle model inconsistency within and outside the target box, color discontinuity within and outside the target box, and texture discontinuity within and outside the target box.

In a further variation, the plurality of negative samples further comprise a second negative sample being a real image that does not contain a local image indicating vehicle damage in its target box.

In a further variation, the discriminative model further comprises a semantic recognition model configured to determine whether the target box of a sample contains a local image indicating vehicle damage.

In a further variation, the system uses the generated vehicle damage image to train a vehicle damage identification model for identifying damage to a vehicle based on a vehicle damage image.

Another aspect of the present specification provides a computer-executed apparatus for generating a vehicle damage image, which comprises:

a first acquisition unit configured to acquire a first image, the first image being a real image of a vehicle;

a second acquisition unit configured to acquire a second image on the basis of the first image, the second image being obtained by labeling a target box on the first image and removing a local image within the target box; and an input unit configured to input the second image into an image filling model to obtain, from an output of the image filling model, a vehicle damage image having the target box, wherein the image filling model outputs the vehicle damage image having the target box by filling a local image of vehicle damage into the target box of the second image.

In one embodiment, the first image comprises or does not comprise a local image of vehicle damage.

In one embodiment, the first image comprises at least one local image of vehicle damage, and the second acquisition unit is further configured to randomly label the target box at the location of at least one local image of vehicle damage.

In one embodiment, the second acquisition unit is further configured to label the target box at a first location, wherein the first location is a location randomly determined from a plurality of second locations, and the second location is a location at which vehicle damage occurs with a high probability obtained by statistics.

In one embodiment, the second acquisition unit is further configured to remove a local image within the target box by performing a dot-product operation on the first image by means of a mask.

In one embodiment, the image filling model is trained by a first training apparatus, the first training apparatus is used for training a generative model in a GAN model, and the GAN model further comprises a discriminative model, wherein the discriminative model is used for determining whether an output image of the generative model is a real image and whether a local image of vehicle damage is in the target box of the output image, and wherein the first training apparatus comprises:

a third acquisition unit configured to acquire a plurality of third images, the third images being real images of a vehicle;

a fourth acquisition unit configured to obtain a plurality of fourth images on the basis of the plurality of third images, the fourth images being obtained by labeling target boxes on the corresponding third images and removing local images within the target boxes; and a first training unit configured to train the generative model by using at least the plurality of fourth images and on the basis of the discriminative model, and regard the same as the image filling model.

In one embodiment, the discriminative model is trained by a second training apparatus, which comprises:

a fifth acquisition unit configured to acquire a plurality of positive samples and a plurality of negative samples, wherein both the positive sample and the negative sample are vehicle images comprising target boxes; the positive sample is a real image, and a local image within the target box of the positive sample is a local image of vehicle damage; the plurality of negative samples comprise at least one first negative sample, and the first negative sample is a non-real image acquired by replacing the local image within the target box of the real image with another local image; and a second training unit configured to use the plurality of positive samples and the plurality of negative samples to train a classification model to be used as the discriminative model.

In one embodiment, the first negative sample comprises at least one of the following features: component inconsistency within and outside the target box, vehicle model inconsistency within and outside the target box, color discontinuity within and outside the target box, and texture discontinuity within and outside the target box.

In one embodiment, the plurality of negative samples further comprise at least one second negative sample, and the second negative sample is a real image that does not contain a local image of vehicle damage in the target box.

In one embodiment, the discriminative model comprises a semantic recognition model, the semantic recognition model being used for determining whether the target box of a sample contains a local image of vehicle damage.

In one embodiment, the apparatus further comprises a using unit configured to use the vehicle damage image to train a vehicle damage identification model after the vehicle damage image is generated, wherein the vehicle damage identification model is used to identify damage to a vehicle on the basis of a vehicle damage image.

Another aspect of the present specification provides a computing device comprising a memory and a processor, wherein the memory comprises an executable code stored therein, and when the executable code is executed by the processor, the method of any one of the above is implemented.

On the basis of the GAN model-based scheme of the embodiments of the present specification, images generated by the generative model can be used as labeled training samples for training the vehicle damage identification model. Therefore, without manual labeling, a massive amount of labeling data can be generated directly by the generative model, and samples of various circumstances, such as vehicle models, lighting conditions, degrees of usage, and photograph angles, can be exhausted, thus increasing the accuracy of the vehicle damage identification model.

BRIEF DESCRIPTION OF THE DRAWINGS

To describe technical schemes of the embodiments disclosed herein more clearly, the embodiments of the present specification may be made clearer by describing them with reference to accompanying drawings.

DETAILED DESCRIPTION

Embodiments of the present specification will be described below with reference to accompanying drawings.

Figure 1:
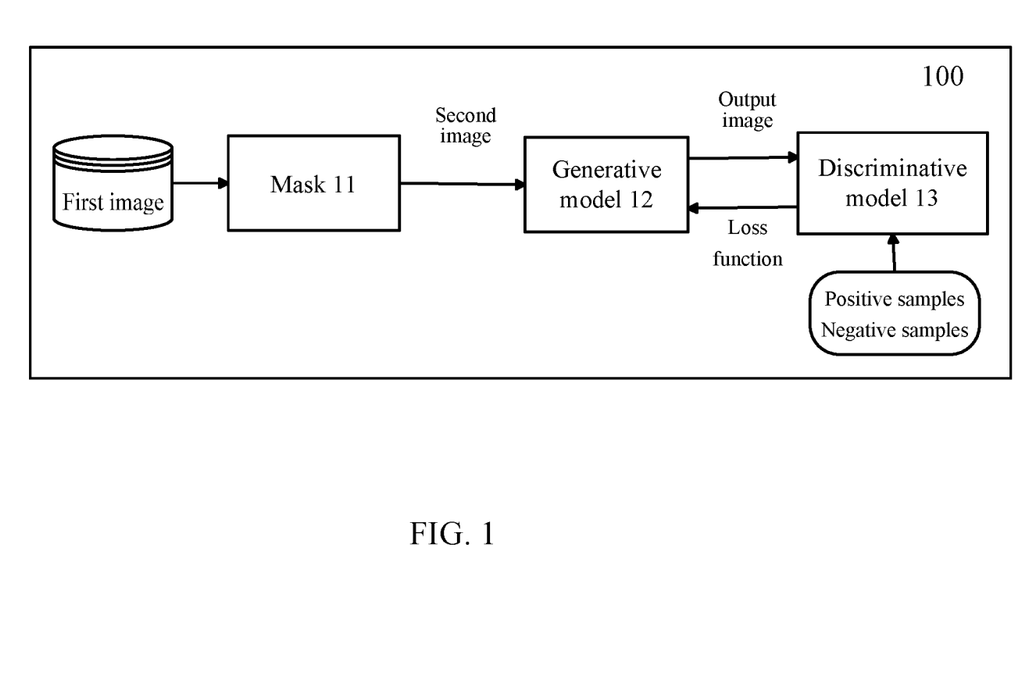
FIG. 1 illustrates a schematic diagram of a vehicle damage image generation system 100 according to an embodiment of the present specification.

FIG. 1 illustrates a schematic diagram of a vehicle damage image generation system 100 according to an embodiment of the present specification. As shown in FIG. 1, system 100 comprises a mask 11, a generative model 12, and a discriminative model 13. Generative model 12 and discriminative model 13 constitute a Generative Adversarial Network (GAN), and mask 11 is used to determine a location of a target box on the actually captured vehicle image and remove a local image within the target box.

At the model training stage, firstly, discriminative model 13 is trained using at least one positive sample and/or at least one negative sample. A positive sample, for example, is an image acquired by capturing a vehicle damage photograph of an accident vehicle, and the image comprises a target box for labeling the vehicle damage. A negative sample, for example, is an image acquired by removing a local image in the target box of the above image and filling another vehicle damage image into the target box. A loss function of discriminative model 13 is related to the semantic content included within and outside the target box, and is related to the smoothness and the like within and outside the target box. In particular, discriminative network 13 determines whether components are the same inside and outside the target box, whether an image within the target box is a vehicle damage image, whether colors and textures are continuous inside and outside the target box, and the like. The more accurate the determination of discriminative network 13 for the sample is, the smaller the loss function is. Thus, discriminative model 13 is trained by the at least one positive sample and/or at least one negative sample to reduce the loss function of discriminative model 13.

After discriminative model 13 is well trained, generative model 12 can be trained using discriminative model 13. Specifically, at least one actually captured vehicle image (i.e., a first image) is input to the mask 11 to obtain at least one training sample (a second image), which, as described above, is an image obtained by determining a location of the target box on the actually captured vehicle image using mask 11 and removing a local image within the target box. Training generative model 12 by using the at least one training sample reduces the loss function of generative model 12. The loss function of generative network 12 is obtained by performing a determination operation on at least one output image on the basis of discriminative model 13, wherein the at least one output image is images respectively generated by using the generative model to fill in the target boxes of the at least one second image. That is, generative model 12 is trained so that discriminative model 13 gives a greater discriminant value for the vehicle damage image generated by generative model 12, i.e., more like a real image.

Figure 2:
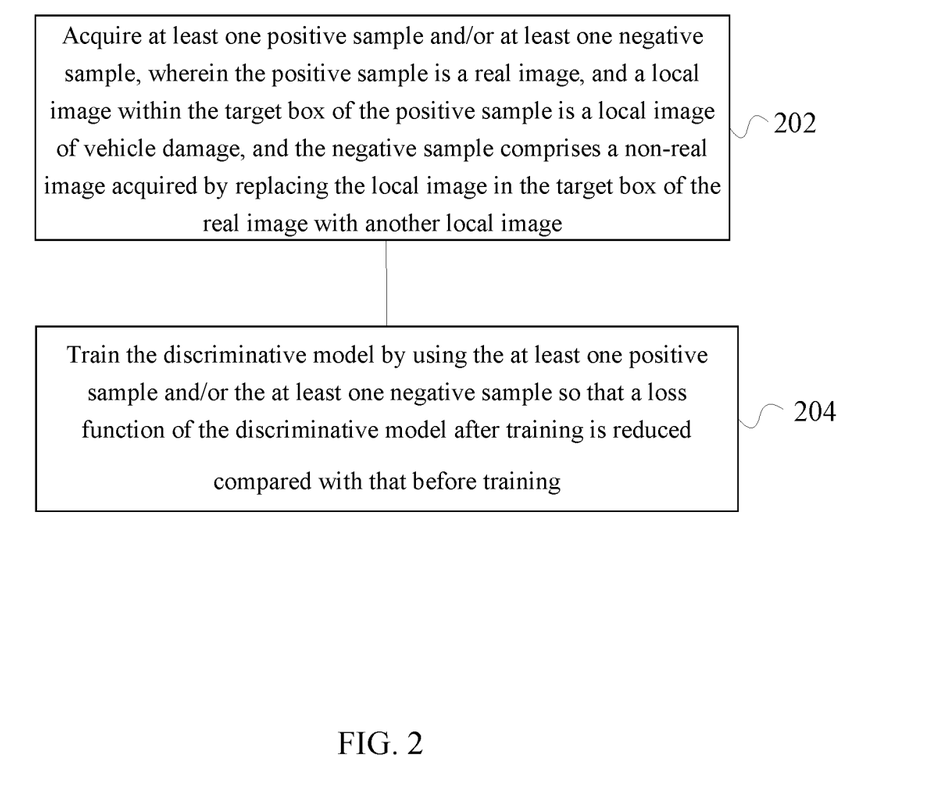
FIG. 2 illustrates a flowchart of a method for training a discriminative model for vehicle damage images according to an embodiment of the present specification.

FIG. 2 illustrates a flowchart of a method for training the discriminative model described above according to an embodiment of the present specification. The discriminative model is a classification model that comprises a convolutional neural network. The method is a training process for training the discriminative model, comprising:

at step S202, acquiring at least one positive sample and/or at least one negative sample, wherein both the positive sample and the negative sample are vehicle images including target boxes; the positive sample is a real image and a local image within the target box of the positive sample is a local image of vehicle damage; and the at least one negative sample comprises a non-real image obtained by replacing the local image within the target box of the real image with another local image; and at step S204, training the discriminative model by using the at least one positive sample and/or the at least one negative sample so that a loss function of the discriminative model after training is reduced compared with that before training, wherein the loss function is related to determining respective sample truthfulness of the at least one positive sample and/or the at least one negative sample.

Firstly, at step S202, at least one positive sample and/or at least one negative sample are obtained, wherein both the positive sample and the negative sample are vehicle images including target boxes; wherein the positive sample is a real image and a local image within the target box of the positive sample is a local image of vehicle damage; and wherein the at least one negative sample comprises a non-real image obtained by replacing the local image within the target box of the real image with another local image.

The discriminative model determines the truthfulness of the input image and the semantics in the image target box, and the output is a probability score of the image being used as a labeled vehicle damage image. The real image is an unprocessed image obtained directly by photographing. For example, for a trained discriminative model, when a real vehicle damage-labeled vehicle image is input, its output value should be close to 1, that is, the probability that the image can be used as a labeled vehicle damage image is close to 100%, whereas when a processed non-real image is input, its output value should be close to 0, that is, the probability that the image can be used as a labeled vehicle damage image is close to 0. It is understood that the output value of the discriminative model described above is merely exemplary, and rather than being limited to a probability value between 0 and 1, it may be set freely depending on the needs of the specific scenario. For example, the output value of the discriminative model may be a sum of several probabilities, and the like.

In the present specification, the discriminative model is used to detect whether a vehicle damage image having a target box (i.e., an image of a damaged vehicle) is real and whether a vehicle damage image is in the target box. In addition, it is used to obtain, on the basis of this training purpose, positive samples and negative samples for training a discriminative model. As a result, the positive sample is a real image of an accident vehicle and a target box that marks the damage to the vehicle is labeled on the real image. The at least one negative sample comprises a first negative sample, which is a non-real image acquired by replacing a local image in the target box of the real image with another local image. For example, the first negative sample is generated by randomly determining a location of a target box in a real vehicle image, removing the original image in the target box, and filling in the target box by using the initial generative model as shown in FIG. 1, or the first negative sample is generated by posting another vehicle damage image in the target box. The first negative sample comprises at least one of the following features: component inconsistency within and outside the target box, vehicle model inconsistency within and outside the target box, color discontinuity within and outside the target box, and texture discontinuity within and outside the target box.

At step S204, training the discriminative model by using the at least one positive sample and/or the at least one negative sample so that a loss function of the discriminative model after training is reduced compared with that before training, wherein the loss function is related to determining respective sample truthfulness of the at least one positive sample and/or the at least one negative sample.

After the positive samples and the negative samples are acquired, the positive samples and the negative samples can be substituted into the model's loss function so that parameters of the model can be adjusted using various optimization algorithms. The loss function $L_D(x, \theta)$ of the discriminative model can be shown as formula (1) below:

$$L_D(x, \theta_D) = -\frac{1}{m}\sum_{i,j}^{m}[\log D(x_i^+, \theta_D) + \log(1 - D(x_j^-, \theta_D))] \quad (1)$$

wherein $\theta_D$ represents a parameter of the discriminative model, $x_i^+$ represents the positive sample, $x_j^-$ represents the negative sample, the sum of i and j is m, and $D(x_i^+, \theta_D)$ and $D(x_j^-, \theta_D)$ correspond to the prediction formula of the model discriminant value. According to this loss function, the greater the discriminant value of the positive sample, the smaller the loss function, and the smaller the discriminant value of the negative sample, the smaller the loss function, that is, the loss function reflects the accuracy of the model's determination for the positive and the negative samples. $\theta$ can be adjusted by, for example, gradient decent, so that the loss function value is reduced and the model is more accurate.

As described above, the discriminative model according to embodiments of the present specification is used to determine the truthfulness of an image and whether vehicle damage is comprised in the target box of the image. Therefore, the loss function used to train the discriminative model is also determined on the basis of the purpose of the discriminative model. Thus, the loss function comprises a loss term associated with determining the truthfulness of the sample, and a loss term associated with determining the semantic content in the target box. Determining the truthfulness of the sample may comprise determining whether the component is consistent within and outside the target box, whether the vehicle model is consistent within and outside the target box, whether the color is continuous within and outside the target box, whether the texture is continuous within and outside the target box, etc. Additionally, determining the continuousness of color may further comprise determining the continuousness of brightness, contrast, and the like. Thus, on the basis of specific content for determining, specific forms of the loss function may include a variety of forms.

In one embodiment, to enhance the determination of semantic content within the target box, the at least one negative sample described above further comprises a second negative sample, the second negative sample being a real image of which the target box does not contain a local image of vehicle damage, and the loss function is further related to determining the following item for the at least one positive sample and/or the at least one negative sample: whether a local image of vehicle damage is contained within the target box of the sample. In this case, the loss function expressed in formula (1) above can be adjusted according to the model configuration.

In one embodiment, the discriminative model for vehicle damage images comprises a vehicle damage identification model for determining whether a local image of vehicle damage is contained within the target box of the sample. The output value of the discriminative model is obtained comprehensively on the basis of determining of truthfulness of the image and the discriminant value of the vehicle damage identification model described above. Thus, additional training steps may be omitted by using existing semantic recognition models (e.g., various semantic recognition models based on imagenet) for vehicle damage identification.

Figure 3:
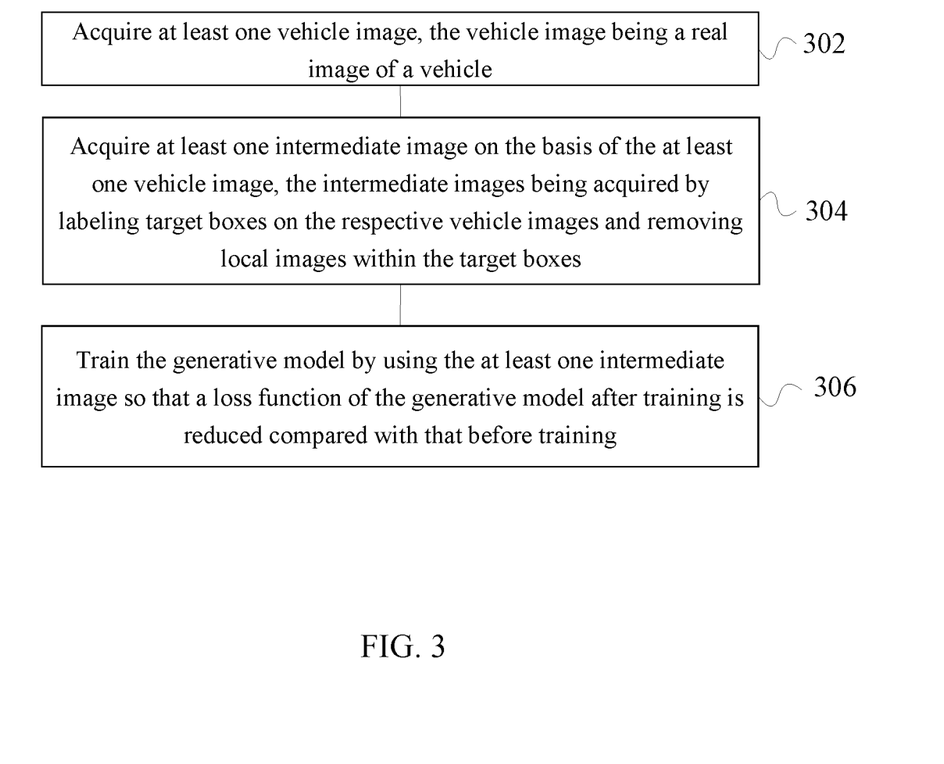
FIG. 3 illustrates a flowchart of a method for training an image filling model according to an embodiment of the present specification.

FIG. 3 illustrates a flowchart of a method for training the generative model described above according to an embodiment of the present specification. The generative model comprises a convolutional neural network, and the method is a training process for training the generative model, comprising:

at step S302, acquiring at least one vehicle image, the vehicle image being a real image of a vehicle;

at step S304, acquiring at least one intermediate image on the basis of the at least one vehicle image, the intermediate images being acquired by labeling target boxes on the corresponding vehicle images and removing local images within the target boxes; and at step S306, training the generative model by using the at least one intermediate image so that a loss function of the generative model after training is reduced compared with that before training, wherein the loss function is acquired by performing a determination operation on at least one output image on the basis of the discriminative model trained through the method shown in FIG. 2, and the at least one output image is images respectively generated by filling in the target boxes of the at least one intermediate image using the generative model.

Firstly, at step S302, at least one vehicle image is acquired, and the vehicle image is a real image of a vehicle. For example, the vehicle image may be a photograph of an accident vehicle or a photograph of a non-damaged vehicle. That is, the vehicle image may or may not comprise a local image of vehicle damage.

At step S304, at least one intermediate image is acquired on the basis of the at least one vehicle image, and the intermediate images are acquired by labeling target boxes on the respective vehicle images and removing local images within the target boxes.

That is, the intermediate image is acquired by removing an image within an area of the vehicle image. Firstly, the location of the to-be-removed area (that is, the target box) is determined. Here, the location of the target box can be determined randomly. In one embodiment, the vehicle image comprises the local image of vehicle damage, in which case the location of the target box can be determined as the location where the local image of damage is located in the vehicle image. In one embodiment, the vehicle image comprises a plurality of local images of vehicle damage, in which case the location of the target box can be randomly determined as one of the locations where the plurality of local images of vehicle damage are located. In one embodiment, a plurality of locations where the vehicle is prone (highly probable) to damage can be determined on the basis of the existing multiple vehicle damage samples, and the location of the target box can be determined randomly from the plurality of locations.

After determining the location of the target box, the original image within the target box of the vehicle image can be removed using a mask. For example, the mask is a matrix of the same size as the image, where the matrix value corresponding to the target box is set to 0, the matrix value at other locations is set to 1, and a dot-product operation is performed on the mask and the vehicle image. Therefore, pixels within the target box can be erased and pixels outside the target box can be maintained, and thus the original image within the target box is removed.

At step S306, the generative model is trained using the at least one intermediate image so that a loss function of the generative model after training is reduced compared with that before training, wherein the loss function is acquired by performing a determination operation on at least one output image on the basis of the discriminative model trained through the method shown in FIG. 2, and the at least one output image is images generated by filling in the target boxes of the at least one intermediate image using the generative model.

The loss function $L_G(z, \theta_G)$ of the generative model can be shown as formula (2) below:

$$L_G(z, \theta_G) = \frac{1}{m} \sum_i^m \log(1 - D(G(z_i, \theta_G))) \quad (2)$$

as shown in formula (2), $\theta_G$ is a parameter of the generative model, $z_i$ is input data of the generative model, i.e., the intermediate image, $G(z_i, \theta_G)$ is an output of the generative model, i.e., an output image acquired by filling in the target box of the intermediate image, and $D(G(z_i, \theta_G))$ is a discriminant value output by inputting the output image into the discriminative model trained through the method shown in FIG. 2. As can be seen from formula (2), the greater the discriminant value output by the discriminative model, the smaller the loss function of the generative model. That is, the greater the discriminant value, the more standards-compliant the output image generated by the generative model, and thus the smaller the loss of the model. Thus, $\theta_G$ is adjusted by various optimization algorithms such as gradient descent, so that the loss function is made smaller, and the discriminant value of the discriminative model is made greater, thereby optimizing the generative model.

When the discriminative model is unable to determine the truthfulness and falsehood of the output image generated by the generative model (e.g., the output value of the discriminative model is 0.5), the training of the generative model can be completed, and the trained generative model is an image filling model. The output image generated by the trained generative model described above can fake a real image, being used as a real image of an accident vehicle.

Figure 4:
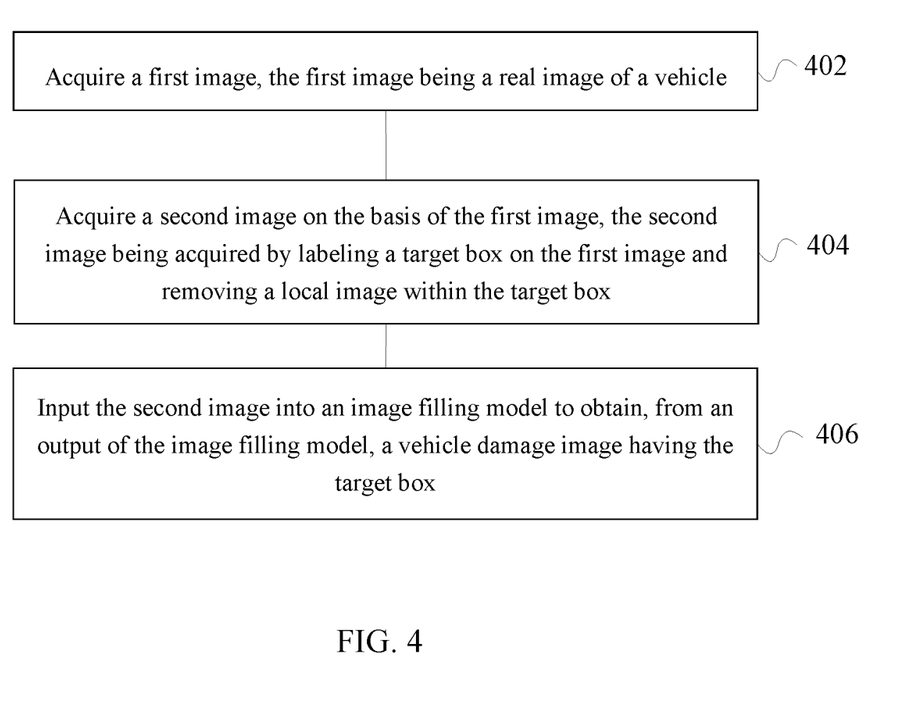
FIG. 4 illustrates a flowchart of a computer-executed method for generating a vehicle damage image according to an embodiment of the present specification.

FIG. 4 illustrates a flowchart of a computer-executed method for generating a vehicle damage image according to an embodiment of the present specification. The method comprises:

at step S402, acquiring a first image, the first image being a real image of a vehicle;

at step S404, acquiring a second image on the basis of the first image, the second image being acquired by labeling a target box on the first image and removing a local image within the target box; and at step S406, inputting the second image into an image filling model to obtain, from an output of the image filling model, a vehicle damage image having the target box, wherein the image filling model outputs the vehicle damage image having the target box by filling a local image of vehicle damage into the target box of the second image.

The specific implementation of steps S402 and S404 in this method can reference steps S302 and S304 in FIG. 3, description of which will not be repeated here.

At step S406, the second image is input into an image filling model to obtain, from an output of the image filling model, an image of vehicle damage having the target box, wherein the image filling model outputs the vehicle damage image having the target box by filling a local image of vehicle damage into the target box of the second image. With reference to the above description, an image generated by the image filling model trained through the method shown in FIG. 3 is close to a real vehicle image, and the generated image comprises a target box which labels a local image of vehicle damage. Images generated by the image filling model can be used as labeled training samples for training a vehicle damage identification model used to identify damage to a vehicle on the basis of vehicle damage images. Therefore, without manual labeling, a massive amount of labeling data can be generated directly using the generative model, and samples of various circumstances, such as vehicle models, lighting conditions, degrees of usage, and photograph angles, can be exhausted, thus increasing the accuracy of the vehicle damage identification model.

Figure 5:
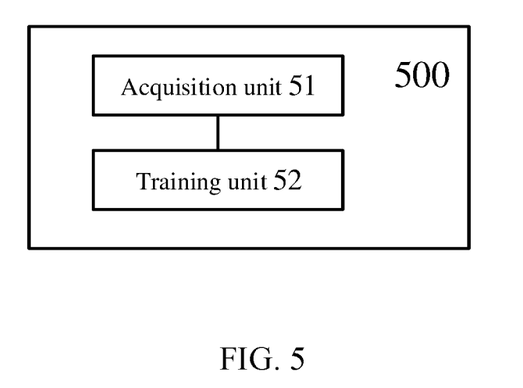
FIG. 5 illustrates an apparatus 500 for training a discriminative model for vehicle damage images according to an embodiment of the present specification.

FIG. 5 illustrates an apparatus 500 for training a discriminative model according to an embodiment of the present specification. The discriminative model is a classification model that comprises a convolutional neural network, and the apparatus comprises:

an acquisition unit 51 configured to acquire at least one positive sample and/or at least one negative sample, wherein both the positive sample and the negative sample are vehicle images including target boxes; the positive sample is a real image and a local image within the target box of the positive sample is a local image of vehicle damage; and the at least one negative sample comprises a non-real image acquired by replacing the local image within the target box of the real image with another local image; and a training unit 52 configured to train the discriminative model by using the at least one positive sample and/or the at least one negative sample so that a loss function of the discriminative model after training is reduced compared with that before training, wherein the loss function is related to determining respective sample truthfulness of the at least one positive sample and/or the at least one negative sample.

In one embodiment, in the apparatus for training the discriminative model, the loss function includes a loss function associated with determining at least one of the following: whether the component is consistent within and outside the target box, whether the vehicle model is consistent within and outside the target box, whether the color is continuous within and outside the target box, and whether the texture is continuous within and outside the target box.

Figure 6:
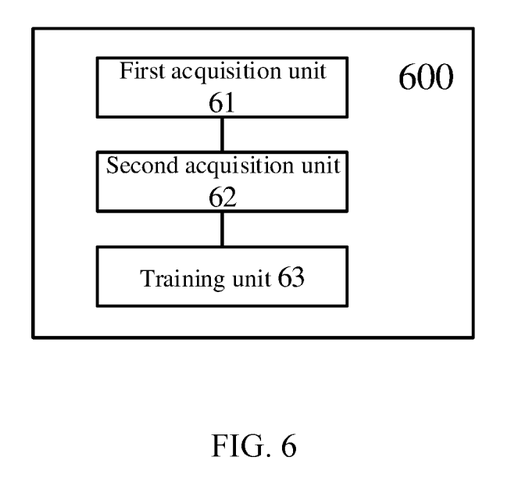
FIG. 6 illustrates an apparatus 600 for training an image filling model according to an embodiment of the present specification.

FIG. 6 illustrates an apparatus 600 for training a generative model according to an embodiment of the present specification. The generative model comprises a convolutional neural network, and the apparatus comprises:

a first acquisition unit 61 configured to acquire at least one vehicle image, the vehicle image being a real image of a vehicle;

a second acquisition unit 62 configured to acquire at least one intermediate image on the basis of the at least one vehicle image, the intermediate images being acquired by labeling target boxes on the respective first images and removing local images within the target boxes; and a training unit 63 configured to train the generative model by using the at least one intermediate image so that a loss function of the generative model after training is reduced compared with that before training, wherein the loss function is acquired by performing a determination operation on at least one output image on the basis of the discriminative model for vehicle damage images trained through the apparatus for training the discriminative model described above, and the at least one output image is images generated by the generative model by filling in the target boxes of the at least one intermediate image.

In one embodiment, the vehicle image comprises or does not comprise a local image of vehicle damage.

In one embodiment, the vehicle image comprises at least one local image of vehicle damage, and the second acquisition unit 62 is further configured to randomly label the target box at the location of at least one local image of vehicle damage.

In one embodiment, the second acquisition unit 62 is further configured to label the target box at a first location, wherein the first location is a location randomly determined from a plurality of second locations, and the second location is a location at which vehicle damage occurs with a high probability acquired by statistics.

In one embodiment, the second acquisition unit 62 is further configured to remove a local image within the target box by performing a dot-product operation on the first image by means of a mask.

Figure 7:
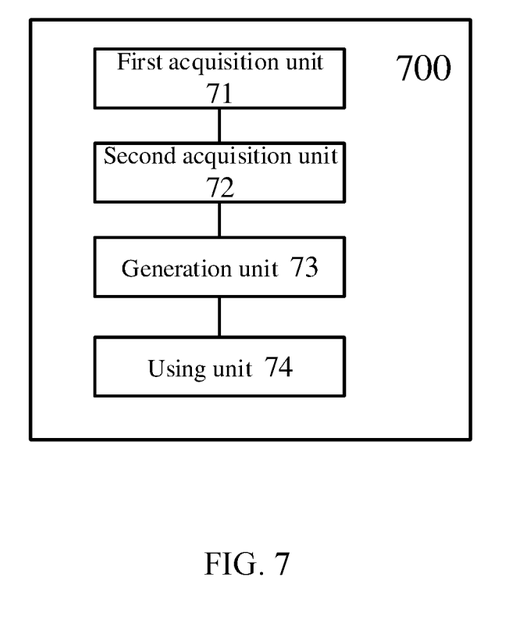
FIG. 7 illustrates a computer-executed apparatus 700 for generating a vehicle damage image according to an embodiment of the present specification.

FIG. 7 illustrates a computer-executed apparatus 700 for generating a vehicle damage image according to an embodiment of the present specification, and the apparatus comprises:

a first acquisition unit 71 configured to acquire a first image, the first image being a real image of a vehicle;

a second acquisition unit 72 configured to acquire a second image on the basis of the first image, the second image being acquired by labeling a target box on the first image and removing a local image within the target box; and a generation unit 73 configured to input the second image into an image filling model to obtain, from an output of the image filling model, a vehicle damage image having the target box, wherein the image filling model outputs the vehicle damage image having the target box by filling a local image of vehicle damage into the target box of the second image.

In one embodiment, the apparatus for generating the vehicle damage image further comprises a using unit 74 configured to use the vehicle damage image to train a vehicle damage identification model after the vehicle damage image is generated, wherein the vehicle damage identification model is used to identify damage to a vehicle on the basis of a vehicle damage image.

Another aspect of the present specification provides a computing device comprising a memory and a processor, wherein the memory comprises an executable code stored therein, and when the executable code is executed by the processor, the method of any one of the above is implemented.

Figure 8:
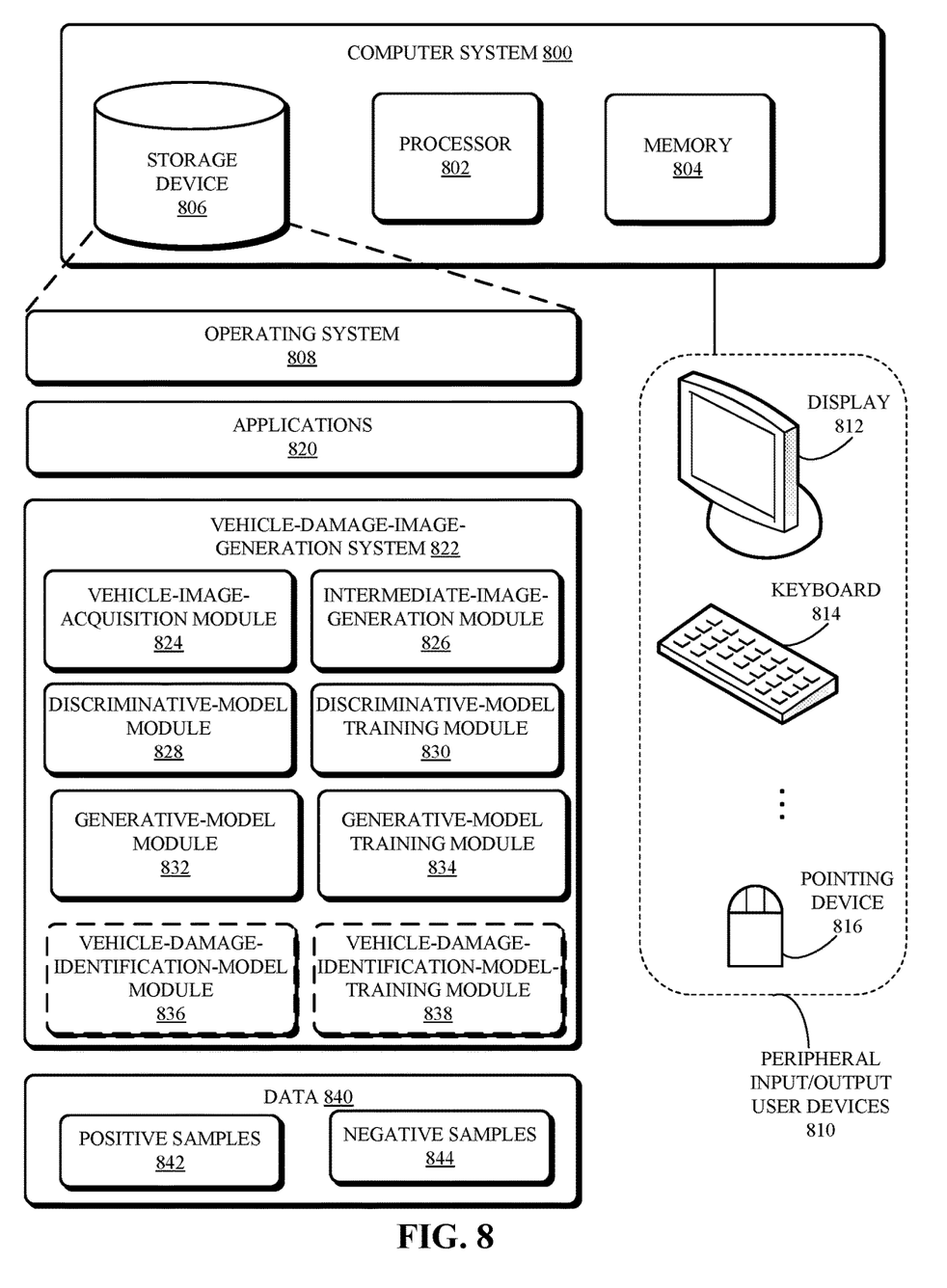
FIG. 8 illustrates an exemplary computer and communication system for generating vehicle damage images according to one embodiment of the present specification.

FIG. 8 illustrates an exemplary computer and communication system for generating vehicle damage images according to one embodiment of the present specification. In FIG. 8, computer system 800 can include a processor 802, a memory 804, and a storage device 806. Furthermore, computer system 800 can be coupled to peripheral input/output (I/O) user devices 810, e.g., a display device 812, a keyboard 814, and a pointing device 816. Storage device 806 can store an operating system 808, one or more applications 820, a vehicle-damage-image-generation system 822, and data 840.

Applications 820 can include instructions, which can be loaded from storage device 806 into memory 804 and executed by processor 802. As a result, computer system 800 can perform specific functions provided by applications 820.

Vehicle-damage-image-generation system 822 can include instructions, which when executed by computer system 800, can cause computer system 800 or processor 802 to perform methods and/or processes described in this disclosure. Specifically, vehicle-damage-image-generation system 822 can include instructions for acquiring a vehicle image (vehicle-image-acquisition module 824), instructions for generating an intermediate images based on the vehicle image (intermediate-image-generation module 826), instructions for implementing a discriminative model (discriminative-model module 828), instructions for training the discriminative model using positive and negative samples (discriminative-model-training module 830), instructions for implementing a generative model (generative-model module 832), instructions for training the generative model using the intermediate image and the discriminative model (generative-model-training module 834), optional instructions for implementing a vehicle damage identification model (vehicle-damage-identification module 836), and optional instructions for training the vehicle damage identification model (vehicle-damage-identification-model-training module 838).

Data 840 can include positive samples 842 and negative samples 844.

In some embodiments, applications 820 and the various modules in sample-labeling system 822, such as modules 824, 826, 828, 830, 832, 834, 836, and 838 can be partially or entirely implemented in hardware and can be part of processor 802. Further, in some embodiments, the system may not include a separate processor and memory. Instead, in addition to performing their specific tasks, modules 820, 824, 826, 828, 830, 832, 834, 836, and 838, either separately or in concert, may be part of general- or special-purpose computation engines.

Figure 9:
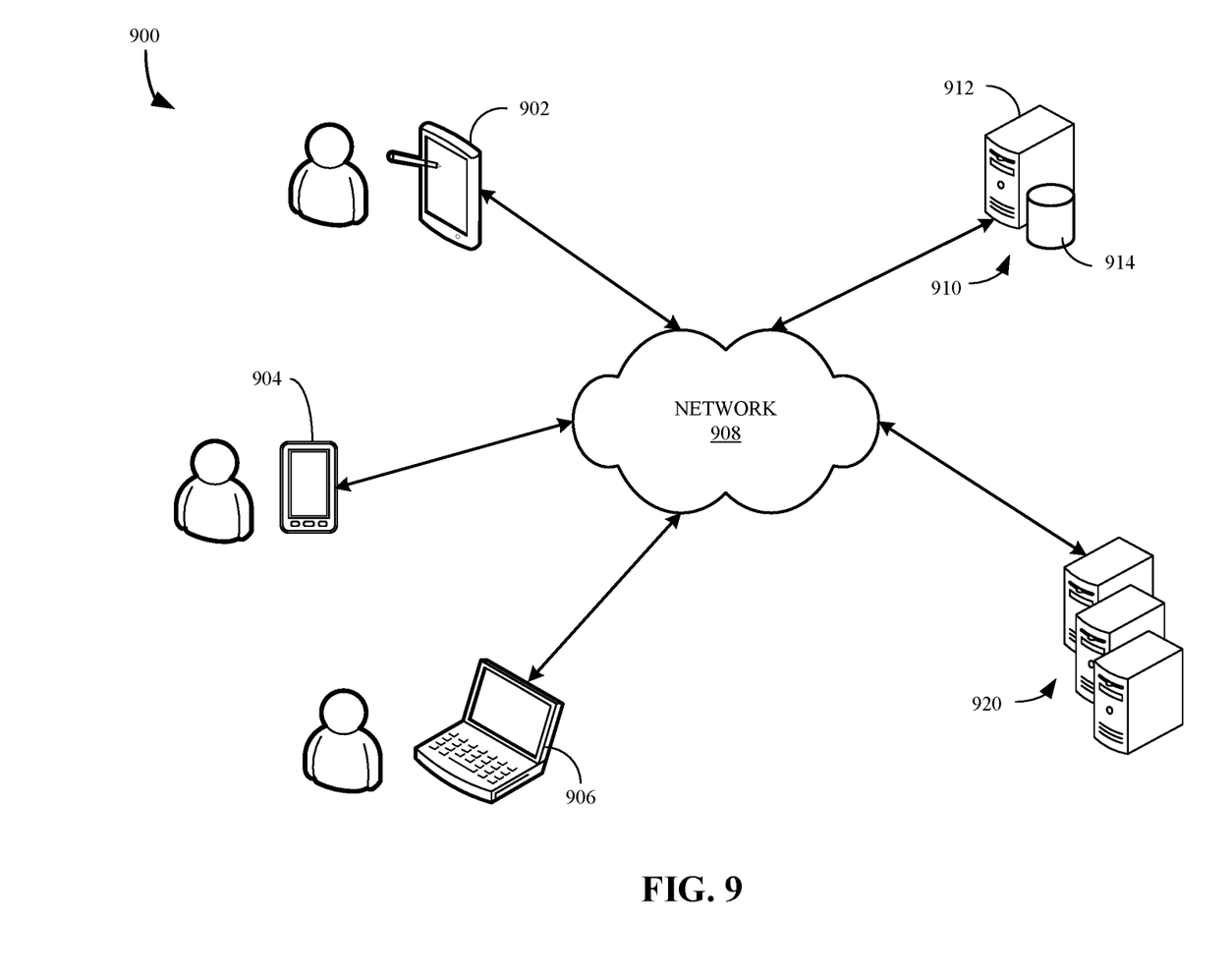
FIG. 9 illustrates an exemplary network environment for implementing the disclosed technology, in accordance with some embodiments described herein.

FIG. 9 illustrates an exemplary network environment for implementing the disclosed technology, in accordance with some embodiments described herein. A network environment 900 includes a number of electronic devices 902, 904 and 906 communicably connected to a server 910 by a network 908. One or more remote servers 920 are further coupled to the server 910 and/or the one or more electronic devices 902, 904 and 906.

In some exemplary embodiments, electronic devices 902, 904 and 906 can be computing devices such as laptop or desktop computers, smartphones, PDAs, wearable devices (e.g., smartwatches, smartglasses, etc.) portable media players, tablet computers, televisions or other displays with one or more processors coupled thereto or embedded therein, or other appropriate computing devices that can be used for displaying a web page or web application. In one example, the electronic devices 902, 904 and 906 store a user agent such as a browser or application. In the example of FIG. 9, electronic device 902 is depicted as a tablet computer, electronic device 904 is depicted as a smartphone, and electronic device 906 is depicted as a laptop computer.

Server 910 includes a processing device 912 and a data store 914. Processing device 912 executes computer instructions stored in data store 914, for example, to assist in scheduling a customer-initiated service or a service-provider-initiated service between a service provider and a customer at electronic devices 902, 904 and 906 during a service scheduling process.

In some exemplary aspects, server 910 can be a single computing device such as a computer server. In other embodiments, server 910 can represent more than one computing device working together to perform the actions of a server computer (e.g., cloud computing). The server 910 may host the web server communicably coupled to the browser at the client device (e.g., electronic devices 902, 904 or 906) via network 908. In one example, the server 910 may host a client application for scheduling a customer-initiated service or a service-provider-initiated service between a service provider and a customer during a service scheduling process. Server 910 may further be in communication with one or more remote servers 920 either through the network 908 or through another network or communication means.

The one or more remote servers 920 may perform various functionalities and/or storage capabilities described herein with regard to the server 910, either alone or in combination with server 910. Each of the one or more remote servers 920 may host various services. For example, servers 920 may host services providing information regarding one or more suggested locations such as web pages or websites associated with the suggested locations, services for determining the location of one or more users or establishments, search engines for identifying results for a user query, one or more user review or query services, or one or more other services providing information regarding one or more establishments, customers and/or reviews or feedback regarding the establishments.

Each of the one or more remote servers 920 can be a single computing device such as a computer server or can represent more than one computing device working together to perform the actions of a server computer (e.g., cloud computing). In one embodiment server 910 and one or more remote servers 920 may be implemented as a single server or a cluster of servers. In one example, server 910 and one or more remote servers 920 may communicate through the user agent at the client device (e.g., electronic devices 902, 904 or 906) via network 908.

Users may interact with the system hosted by server 910, and/or one or more services hosted by remote servers 920, through a client application installed at the electronic devices 902, 904, and 906. Alternatively, the user may interact with the system through a web-based browser application at the electronic devices 902, 904, and 906. Communication among client devices 902, 904, 906 and the system, and/or one or more services, may be facilitated through a network (e.g., network 908).

Communication among the client devices 902, 904, 906, server 910 and/or one or more remote servers 920 may be facilitated through various communication protocols. In some aspects, client devices 902, 904, 906, server 910 and/or one or more remote servers 920 may communicate wirelessly through a communication interface (not shown), which may include digital signal processing circuitry where necessary. The communication interface may provide for communications under various modes or protocols, including Global System for Mobile communication (GSM) voice calls; Short Message Service (SMS), Enhanced Messaging Service (EMS), or Multimedia Messaging Service (MMS) messaging; Code Division Multiple Access (CDMA); Time Division Multiple Access (TDMA); Personal Digital Cellular (PDC); Wideband Code Division Multiple Access (WCDMA); CDMA2000; or General Packet Radio System (GPRS), among others. For example, the communication may occur through a radio-frequency transceiver (not shown). In addition, short-range communication may occur, including via the use of a Bluetooth-enabled device, Wi-Fi®, or another such transceiver.

Network 908 can include, for example, any one or more of a personal area network (PAN), a local area network (LAN), a campus area network (CAN), a metropolitan area network (MAN), a wide area network (WAN), a broadband network (BBN), the Internet, and the like. Further, network 908 can include, but is not limited to, any one or more of the following network topologies, including a bus network, a star network, a ring network, a mesh network, a star-bus network, a tree or hierarchical network, and the like.

On the basis of the GAN model-based scheme of the embodiments of the present specification, images generated by the generative model can be used as labeled training samples for training the vehicle damage identification model. Therefore, without manual labeling, a massive amount of labeling data can be generated directly by the generative model, and samples of various circumstances, such as vehicle models, lighting conditions, degrees of usage, and photograph angles, can be exhausted, thus increasing the accuracy of the vehicle damage identification model.

Each embodiment of the present application is described in a progressive manner, and the same or similar sections between various embodiments are described with reference to each other, each of which is focused on the differences with another embodiment. Especially, the system embodiment is described relatively briefly because it is substantially similar to the method embodiments, and for related parts, reference may be made to the method embodiments.

The foregoing describes specific embodiments of the present application. Other embodiments fall within the scope of the appended claims. In some cases, the actions or steps recited in the claims may be performed in a sequence different from the order in the embodiments and may still achieve the desired result. Further, the processes depicted in the drawings do not necessarily require the particular order or sequential order shown to achieve the desired result. In certain implementations, multitasking and parallel processing is or may be advantageous.

It will be further appreciated by those of ordinary skill in the art that units and algorithms of each example described in the embodiments disclosed herein can be implemented by an electronic hardware, computer software, or a combination thereof. In order to clearly illustrate the interchangeability of hardware and software, compositions and steps of each example have been generally described in terms of function in the above description. Whether these functions are implemented in hardware or software depends on the specific application and design constraints of the technical scheme. Those of ordinary skill in the art may use different methods to implement the described functions for each particular application, but such implementation should not be considered beyond the scope of this application.

The steps of the methods or algorithms described in connection with the embodiments disclosed herein may be implemented with hardware, a software module executed by a processor, or a combination thereof. The software module may be placed in a Random Access Memory (RAM), a memory, a Read-Only Memory (ROM), an electrically programmable ROM, an electrically erasable programmable ROM, a register, a hard disk, a removable disk, a CD-ROM, or any other form of storage medium known in the art.

The objectives, the technical schemes, and the beneficial effects of the present specification are further described in detail in the foregoing specific implementation. It should be understood that the foregoing descriptions are merely specific implementation of the present specification, and are not intended to limit the protection scope of the present specification. Any modification, equivalent replacement, and improvement made on the basis of the spirits and the principles of the present specification shall fall within the protection scope of the present specification.

What is claimed is:

1. A computer-executed method for generating a vehicle damage image, comprising:
    obtaining a real vehicle image;
    generating, by a computer, an intermediate image based on the real vehicle image by labeling a target box on the real vehicle image and removing a portion of the real vehicle image within the target box; and
    generating the vehicle damage image based on the intermediate image by inputting the intermediate image into a machine-learning model, which outputs the vehicle damage image by filling a local image indicating vehicle damage into the target box of the intermediate image,
    wherein the real vehicle image includes one or more local images indicating vehicle damage, and wherein labeling the target box comprises randomly selecting a labeling location corresponding to one of the one or more local images indicating vehicle damage.

2. The method of claim 1, wherein labeling the target box comprises:
    determining, based on statistics, a plurality of locations at which vehicle damage occurs with a high probability; and
    randomly selecting, from the plurality of locations, a location for labeling the target box.

3. The method of claim 1, wherein removing a portion of the real vehicle image comprises applying a mask, which comprises performing a dot-product operation on the real vehicle image and the mask.

4. The method of claim 1, wherein the machine-learning model is a generative model in a Generative Adversarial Network (GAN) model, wherein the GAN model further comprises a discriminative model for determining whether an output image of the generative model is a real image and whether a local image indicating vehicle damage is in the target box of the output image, and wherein the generative model is trained based on the discriminative model, a second real vehicle image, and a second intermediate image generated based on the second real vehicle image.

5. The method of claim 4, further comprising training the discriminative model by:
    obtaining a plurality of positive samples and a plurality of negative samples, wherein a respective positive sample is a real image comprising a labeled target box, wherein the target box of the positive sample comprises a local image indicating vehicle damage, wherein the plurality of negative samples comprises a first negative sample being a non-real image comprising a labeled target box, and wherein the negative sample is obtained by replacing the local image within the target box of a real image with another local image; and
    using the plurality of positive samples and the plurality of negative samples to train a classification model to be used as the discriminative model.

6. The method of claim 5, wherein the first negative sample comprises at least one of the following features: component inconsistency within and outside the target box, vehicle model inconsistency within and outside the target box, color discontinuity within and outside the target box, and texture discontinuity within and outside the target box.

7. The method of claim 5, wherein the plurality of negative samples further comprises a second negative sample being a real image that does not contain a local image indicating vehicle damage in its target box.

8. The method of claim 5, wherein the discriminative model further comprises a semantic recognition model configured to determine whether the target box of a sample contains a local image indicating vehicle damage.

9. The method of claim 1, further comprising: using the generated vehicle damage image to train a vehicle damage identification model for identifying damage to a vehicle based on a vehicle damage image.

10. A computer-executed apparatus for generating a vehicle damage image, comprising:
    an image-acquisition unit configured to acquire a real vehicle image;
    an intermediate-image generation unit configured to generate an intermediate image based on the real vehicle image by labeling a target box on the real vehicle image and removing a portion of the real vehicle image within the target box; and
    a vehicle-damage-image generation unit configured to generate the vehicle damage image based on the intermediate image by inputting the intermediate image into a machine-learning model, which outputs the vehicle damage image by filling a local image indicating vehicle damage into the target box of the intermediate image,
    wherein the machine-learning model is a generative model in a Generative Adversarial Network (GAN) model, wherein the GAN model further comprises a discriminative model for determining whether an output image of the generative model is a real image and whether a local image indicating vehicle damage is in the target box of the output image, and wherein the generative model is trained based on the discriminative model, a second real vehicle image, and a second intermediate image generated based on the second real vehicle image.

11. The apparatus of claim 10, wherein the real vehicle image comprises one or more local images indicating vehicle damage, and wherein, while labeling the target box, the intermediate-image generation unit is configured to randomly select a labeling location corresponding to one of the one or more local images indicating vehicle damage.

12. The apparatus of claim 10, wherein, while labeling the target box, the intermediate-image generation unit is configured to:
    determine, based on statistics, a plurality of locations at which vehicle damage occurs with a high probability; and
    randomly select, from the plurality of locations, a location for labeling the target box.

13. The apparatus of claim 10, wherein, while removing a portion of the real vehicle image, the intermediate-image generation unit is configured to apply a mask on the real vehicle image, which comprises performing a dot-product operation on the real vehicle image and the mask.

14. The apparatus of claim 10, further comprising a model training unit configured to:
    obtain a plurality of positive samples and a plurality of negative samples, wherein a respective positive sample is a real image comprising a labeled target box, wherein the target box of the positive sample comprises a local image indicating vehicle damage, wherein the plurality of negative samples comprises a first negative sample being a non-real image comprising a labeled target box, and wherein the first negative sample is obtained by replacing the local image within the target box of a real image with another local image; and use the plurality of positive samples and the plurality of negative samples to train a classification model to be used as the discriminative model.

15. The apparatus of claim 14, wherein the first negative sample comprises at least one of the following features: component inconsistency within and outside the target box, vehicle model inconsistency within and outside the target box, color discontinuity within and outside the target box, and texture discontinuity within and outside the target box.

16. The apparatus of claim 14, wherein the plurality of negative samples further comprise a second negative sample being a real image that does not contain a local image indicating vehicle damage in its target box.

17. The apparatus of claim 14, wherein the discriminative model further comprises a semantic recognition model configured to determine whether the target box of a sample contains a local image indicating vehicle damage.

18. The apparatus of claim 10, further comprising a second model training unit configured to use the generated vehicle damage image to train a vehicle damage identification model for identifying damage to a vehicle based on a vehicle damage image.

19. A non-transitory computer-readable storage medium storing instructions that when executed by a computer cause the computer to perform a method for generating a vehicle damage image, the method comprising:

obtaining a real vehicle image;

generating an intermediate image based on the real vehicle image by labeling a target box on the real vehicle image and removing a portion of the real vehicle image within the target box; and generating the vehicle damage image based on the intermediate image by inputting the intermediate image into a machine-learning model, which outputs the vehicle damage image by filling a local image indicating vehicle damage into the target box of the intermediate image, wherein labeling the target box includes:

determining, based on statistics, a plurality of locations at which vehicle damage occurs with a high probability; and randomly selecting, from the plurality of locations, a location for labeling the target box.

20. The non-transitory computer-readable storage medium according to claim 19, wherein the real vehicle image comprises one or more local images indicating vehicle damage, and wherein labeling the target box includes randomly selecting a labeling location corresponding to one of the one or more local images indicating vehicle damage.

21. A computer-executed method for generating a vehicle damage image, comprising:

obtaining a real vehicle image;

generating, by a computer, an intermediate image based on the real vehicle image by labeling a target box on the real vehicle image and removing a portion of the real vehicle image within the target box; and generating the vehicle damage image based on the intermediate image by inputting the intermediate image into a machine-learning model, which outputs the vehicle damage image by filling a local image indicating vehicle damage into the target box of the intermediate image, wherein removing a portion of the real vehicle image includes applying a mask, which includes performing a dot-product operation on the real vehicle image and the mask.

\* \* \* \* \*